United States Patent [19]

Knepler

[11] Patent Number: 5,462,236

[45] Date of Patent: Oct. 31, 1995

[54] CALIBRATEABLE TIMED WEIGHT GRINDER

[75] Inventor: John T. Knepler, Chatham, Ill.

[73] Assignee: Bunn-O-Matic Corporation, Springfield, Ill.

[21] Appl. No.: 217,409

[22] Filed: Mar. 24, 1994

[51] Int. Cl.⁶ .................................................. B02C 19/12
[52] U.S. Cl. .......................... 241/34; 241/100; 241/101.3; 177/25.14; 177/25.19
[58] Field of Search ........................... 241/34, 100, 101.3, 241/36; 177/25.14, 25.19

[56] References Cited

U.S. PATENT DOCUMENTS

| | | | |
|---|---|---|---|
| 4,771,836 | 9/1988 | Vaito et al. | 177/25.18 |
| 4,789,106 | 12/1988 | Weber | 241/101.2 |
| 4,909,338 | 3/1990 | Vitunic et al. | 177/50 |
| 4,971,259 | 11/1990 | Nidiffer | 241/34 |
| 5,186,399 | 2/1993 | Knepler et al. | 241/34 |
| 5,241,898 | 9/1993 | Newnan | 99/280 |
| 5,350,123 | 9/1994 | Illy | 241/37 |
| 5,386,944 | 9/1995 | Knepler et al. | 241/6 |

OTHER PUBLICATIONS

Bunn–O–Matic G9–2, product sheet, copyright 1990.
Bunn–O–Matic G9–2, operating and service manual, copyright 1987.
Bunn–O–Matic, Turbo Model, copyright 1990.

*Primary Examiner*—Mark Rosenbaum
*Assistant Examiner*—John M. Husar
*Attorney, Agent, or Firm*—Trexler, Bushnell, Giangiorgi & Blackstone, Ltd.

[57] ABSTRACT

A coffee grinding apparatus which measures a quantity of coffee for grinding as a function of time and which is calibrateable to accurately discharge a selected weight of ground coffee. The grinding apparatus includes at least one storage hopper in gravity feed relationship with a dispenser and a grinding mechanism. The apparatus includes a control circuit coupled to the dispenser for selectively operating the dispenser to dispense a desired quantity of coffee beans into the grinding mechanism. A selection device is coupled to the control circuit to allow a user to select a desired weight of ground coffee to be produced by the grinding apparatus. A calibration assembly is coupled to the control circuit, which calibration assembly includes controls for entering the actual weight of the ground coffee to be discharged and a microprocessor which includes a circuit for calculating a correction factor to calibrate the grinding apparatus to accurately produce the selected weight of ground coffee.

9 Claims, 1 Drawing Sheet

CALIBRATEABLE TIMED WEIGHT GRINDER

BACKGROUND

The present invention relates to a coffee grinding apparatus which produces a selected weight of ground coffee and includes a calibration circuit to calibrate the grinder to accurately produce the selected weight of ground coffee.

A variety of coffee grinding apparatus are available which weigh a quantity of whole coffee beans to be ground or which measure a desired quantity of whole coffee beans as a function of time. For example, Nidiffer U.S. Pat. No. 4,971,259, issued Nov. 20, 1990 shows a coffee grinding apparatus in which beans are retained in a hopper in a gravity feed relationship with a grinding mechanism. Whole beans are dispensed from the hoppers by opening a dispenser or slide gate thereby allowing the beans to fall from the hopper into the grinder. The dispenser is operated for a period of time to allow a selected quantity of beans to fall from the hopper into the grinder. A user operates the grinding apparatus by selecting a grinding time from a reference chart which time corresponds to the grinding time for a desired weight of ground coffee at a desired grinding setting.

Prior art grinding apparatus are quite useful in grinding coffee. Such apparatus measure the coffee to be ground as a function of time by opening the slide gate or dispenser for a selected period of time. While the weight of the ground coffee is rather consistent, the actual weight ground by the apparatus may vary from the values on the reference chart due to characteristics of the beans and the fineness of the grind. For instance, dark roast beans are lower in density than regular roast and produce less weight than regular coffees for a given time setting. In other words, while the reference chart may be highly accurate for a particular bean or for a sample population of beans, a type of bean other than the bean used to calculate the chart may be result in a weight of ground coffee deviating from the desired weight.

Coffee merchants who sell brewed coffee as well as ground coffee tend to make every effort to ensure predictably consistent coffee flavor produced from their ground coffee. This predictable consistency of the brewed beverage is achieved by accurately grinding a selected weight of ground coffee. Since prior art grinding apparatus do not hold some of the parameters constant, for example the characteristics of the bean, the actual weight of ground coffee produced by these grinding apparatus may deviate from the selected ground weight.

It would be desirable to provide a coffee grinding apparatus which consistently grinds a selected weight of ground coffee. To this end, it would be desirable to provide a coffee grinding apparatus which incorporates the ability to calibrate the grinding apparatus.

OBJECTS AND SUMMARY

A general object of the present invention is to provide a grinding apparatus which includes a calibration circuit to calibrate the apparatus so as to produce an accurate weight measurement of ground coffee.

Briefly, and in accordance with the foregoing, the present invention envisions a coffee grinding apparatus which measures a quantity of coffee for grinding as a function of time and which is calibrateable to accurately discharge a selected weight of ground coffee. The grinding apparatus includes at least one storage hopper in gravity feed relationship with a dispenser and a grinding mechanism. The apparatus includes a control circuit coupled to the dispenser for selectively operating the dispenser to dispense a desired quantity of coffee beans into the grinding mechanism. A selection device is coupled to the control circuit to allow a user to select a desired weight of ground coffee to be produced by the grinding apparatus. A calibration assembly is coupled to the control circuit, which calibration assembly includes controls for entering the actual weight of the ground coffee to be discharged and a microprocessor which includes a circuit for calculating a correction factor to calibrate the grinding apparatus to accurately produce the selected weight of ground coffee.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which.

DETAILED DESCRIPTION OF THE PREFERRED EMBODIMENT

Figure 1:
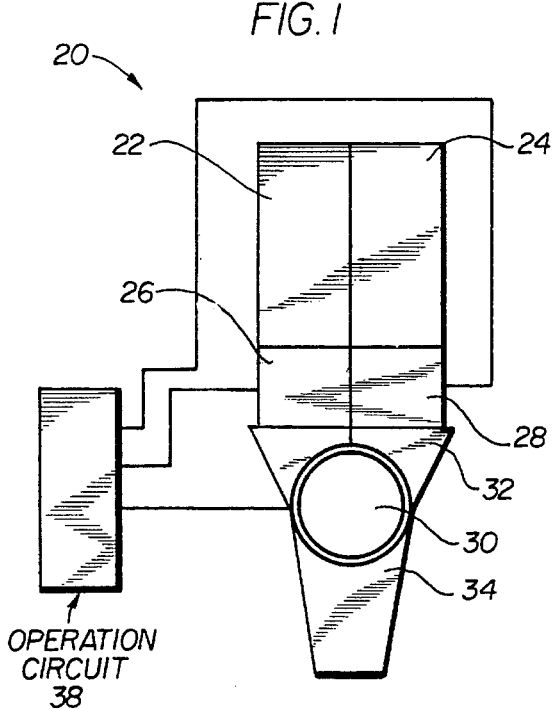
FIG. 1 is a diagrammatic representation of coffee bean grinding apparatus of the present invention.

While the invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

The present invention "fine tunes" the relationship between time and weight for the selected coffee, weight, and fineness. In other words, the present invention allows a user to calibrate or adjust the time-based grinding parameters to more accurately produce the desired weight of ground coffee.

A coffee grinding apparatus 20 of the present invention is shown in FIG. 1. The coffee grinding apparatus 20 includes a pair of hoppers 22, 24 in gravity feed relationship with a corresponding pair of dispensers 26, 28. The dispensers 26, 28 communicate with a grinding mechanism 30 by way of chute 32 disposed therebetween. Whole coffee beans are stored in the hoppers 22, 24 are above the dispensers 26, 28 for gravity feeding into the dispensers 26, 28. The dispensers 26, 28 are controllable for dispensing a desired quantity of beans into the grinding mechanism 30. Ground coffee is discharged from the grinding mechanism 30 through the discharge chute 34 for use in producing a brewed beverage or for sale to customers.

Figure 3:
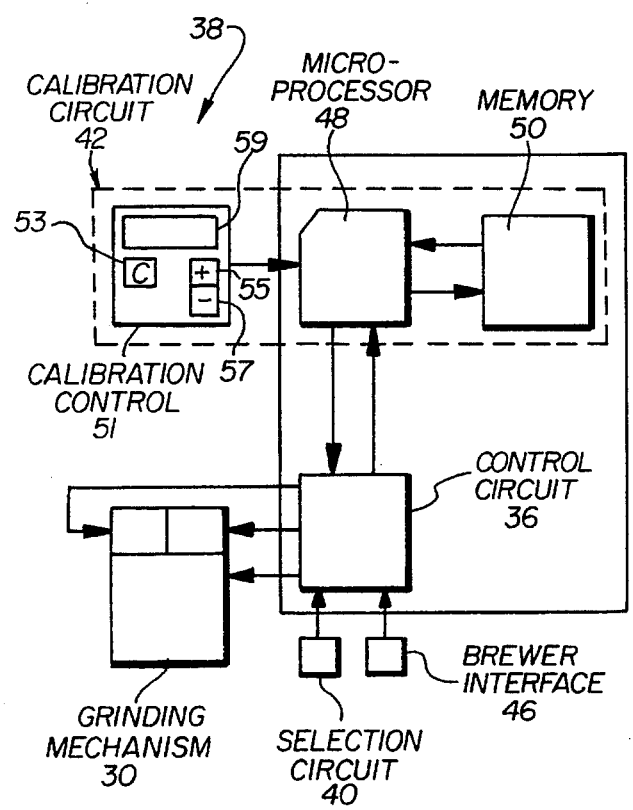
FIG. 3 is a general circuit block diagram illustrating the coupling of the components of the coffee bean grinding apparatus of the present invention.

A control circuit 36 is provided to control the operation of the dispensers 26, 28 and the grinding mechanism 30. The control circuit 36 operates the dispensers 26, 28 for a period of time in accordance with the teachings of the present invention. The control circuit 36 also controls grinding mechanism 30 for a period of time directly related to the operation of the dispensers 26, 28. With reference to FIG. 3, an operation circuit 38 includes the control circuit 36, a selection circuit 40, a calibration circuit 42, and a brewer interface 46 such as a batch selector. The calibration circuit 42 includes a microprocessor 48, memory 50 and a calibration control 51.

The brewer interface 46 is provided to link the grinding apparatus 20 to a beverage brewing apparatus (not shown). The brewer interface 46 permits the selection of a quantity of brewed beverage at the beverage brewing apparatus to be transmitted to the control circuit 36 thereby activating the grinding apparatus 20 to produce the appropriate weight of ground coffee corresponding to the selected quantity of beverage. The selection circuit 40 similarly activates the control circuit 36 to control the dispensers 26, 28 and grinder 30 to produce a selected measurement of ground coffee.

The calibration control 51 includes a calibration activation switch 53, an incrementing key 55, a decrementing key 57, and a display 59. The calibration mode activation switch 53 is activated by user to initiate a calibration cycle. The incrementing and decrementing keys are used to enter a true weight value into the microprocessor 48 and the display 59 displays a value entered by the incrementing and decrementing keys 55, 57. When desired value is displayed in the display 59, the calibration activation switch 53 is once again activated to signal to the microprocessor 48 that the display value is the true weight value to be used in calibrating a grinding correction factor.

Figure 2:
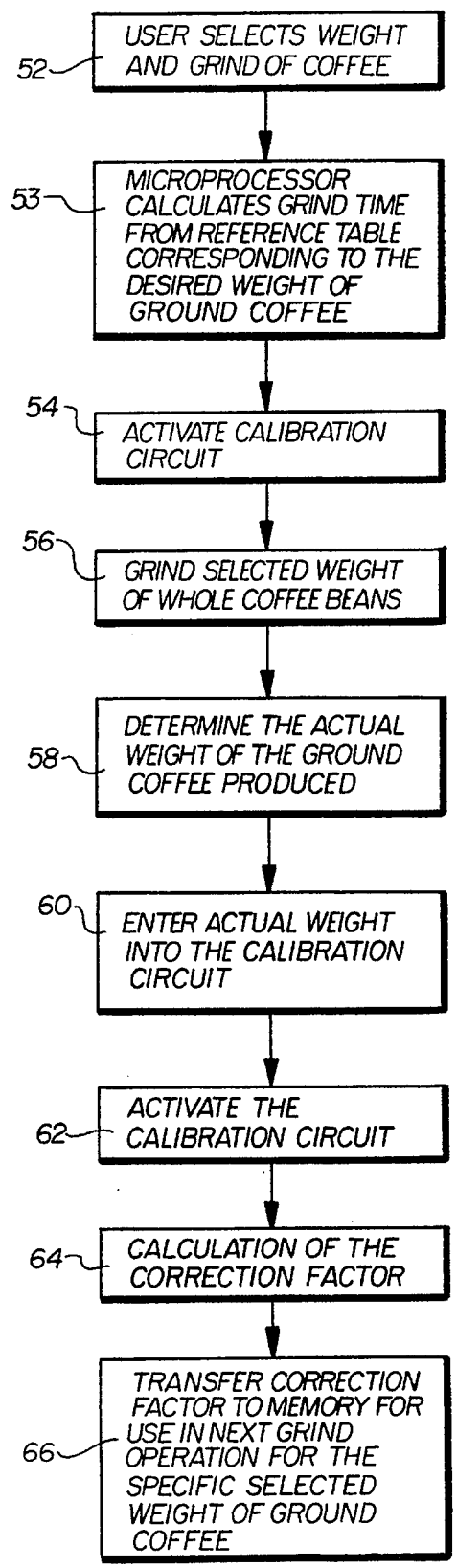
FIG. 2 is a flow diagram illustrating the operation of the coffee bean grinding apparatus of the present inventions.

With reference to FIGS. 2 and 3, the coffee grinding apparatus 20 operates so that a calibration is made to the apparatus to produce a more accurate weight of ground coffee. In use, a user selects (52) the desired grind time corresponding to the desired weight of ground coffee. The grind time is selected from a table (for example, Table 1 below) positioned in close proximity to the grinding apparatus 20. This table allows a user to operate the dispensers 26, 28 and the grinding mechanism 30 for an appropriate amount of time in relation to the desired fineness of grind to achieve the desired weight of ground coffee. For example, with reference to Table 1, provided below, a user desiring to grind three ounces of a regular grind coffee will set the apparatus at the selection device 40 to 2.5 seconds. Similarly, if a user desires to produce eight ounces of a fine grind, the user sets the selection device 40 for 12 seconds.

TABLE 1

| Weight (ounces) | Time (seconds) | | |
| --- | --- | --- | --- |
| | Fine | Drip | Regular |
| 1.5 | 0.5 | 0.5 | 0.5 |
| 1.75 | 0.7 | 0.6 | 0.6 |
| 2.0 | 1.0 | 0.8 | 0.8 |
| 2.25 | 1.4 | 1.4 | 1.2 |
| 2.5 | 1.9 | 1.8 | 1.6 |
| 2.75 | 2.4 | 2.2 | 2.0 |
| 3.0 | 2.9 | 2.7 | 2.5 |
| 3.25 | 3.3 | 3.1 | 2.9 |
| 3.5 | 3.8 | 3.6 | 3.3 |
| 3.75 | 4.2 | 3.9 | 3.6 |
| 4.0 | 4.8 | 4.4 | 4.0 |
| 6.0 | 8.6 | 7.9 | 7.5 |
| 8.0 | 12.0 | 11.5 | 10.9 |
| 10.0 | 15.7 | 15.1 | 14.1 |
| 12.0 | 19.6 | 18.5 | 17.5 |
| 14.0 | 23.5 | 22.0 | 20.9 |
| 16.0 | 27.0 | 25.3 | 24.3 |

Once the user has selected (52) the weight and grind time from the table, the microprocessor 48 computes (53) the appropriate grind time. The user activates (54) the calibration circuit using the calibration control 44. The control circuit 36 then controls one of the dispensers 26, 28 and the grinder 30 to grind (56) a selected weight of coffee. The dispensers and grinder operate according to an equation as set forth herein below, using a calibration factor of zero.

Next, the user intervenes to determine (58) the actual weight of the ground coffee produced. The user removes the ground coffee from the coffee grinding apparatus and weighs the ground coffee to determine the actual weight of the coffee which was ground by the apparatus. After determining the actual weight, the user operates the calibration control 44 to enter (60) the true weight of the ground coffee into the microprocessor 48. Upon completing entry (60) of the true weight into the microprocessor 48, the user activates the calibration switch 53 to enter (62) the weight. The microprocessor 48 receives the weight value entered (62) at the calibration control 44 and calculates (64) a correction factor. The microprocessor 48 transfers the correction factor to the memory 50 for use in the next grind operation for the specified selected weight of ground coffee (66).

The present invention "fine tunes" the relationship between time and weight for the selected coffee, weight, and fineness. In other words, the present invention allows a user to calibrate or adjust the time-based grinding parameters to more accurately produce the desired weight of ground coffee. The equation is maintained in the calibration circuit for use in calibrating the grinding apparatus.

For example, the equation for grinding drip coffee (the middle column of Table 1 hereinabove) is:

$$T = 1.77W - 2.66 \quad \text{for } W \text{ between 2 and 16}$$
$$T = 0.4W \quad \text{for } W \text{ less than 2}$$
$$(W \text{ less than 1 not allowed})$$
$$\text{where:} \quad T \text{ is in seconds, and}$$
$$W \text{ is in ounces}$$

One or more calibration cycles are carried out in an iterative process until a weight of ground coffee within +/−0.1 ounces of the selected ground coffee weight is produced. Computation of the correct factor is achieved by multiplying the difference between the actual weight and the selected weight by 1.77 (if the difference is more than 0.1 ounces). If the difference between the actual weight and the selected weight is less than 0.1 ounces, than a multiplier of 0.8 is used to prevent overshooting the selected weight. The 1.77 and 0.8 multipliers are used for weights greater than 2 ounces. When the weight of the ground coffee is below 2 ounces, multipliers of 0.4 and 0.2 are used.

Note that each time the calibration cycle is repeated, the control uses the previous calibration correction factor as an initial reference point. In other words, subsequent calibration and correction factors are based on the previously calculated correction factor. As a result, the present invention "homes in" on an optimal correction factor with each successive calibration cycle for a selected weight and type of coffee.

The microprocessor 48 and memory 50 store and calculate numerous correction factors for the various grinding values presented in Table 1. The correction factors are retained in a look-up table in the memory 50 which is accessible by the microprocessor 48 when a desired grinding value is selected at the selection device 40. Additionally, the microprocessor 48 is programmed so that if a user inputs a value which has not been adjusted by a calibration cycle, the microprocessor 48 uses the closest calibrated weight to extrapolate a calibration factor for the selected value. In other words (with reference to Table 1), if a user selects a grinding value of 22 in order to produce 14 ounces of drip grind coffee and a calibration factor has only been calculated for 10 ounces of drip coffee, the calibration factor for the 10 ounces of drip coffee will be extrapolated using conventional extrapolation techniques to calculate a correction factor for the 14 ounces of drip coffee. When a calibration cycle is performed for the 14 ounces of drip coffee, the extrapolated correction factor will be the initial reference point in the calibration cycle.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A coffee grinding apparatus which measures a quantity of coffee for grinding as a function of time, said coffee grinding apparatus comprising:

at least one storage hopper;

a controllable dispenser associated with each of said at least one storage hopper for controllably dispensing beans from the associated one of said storage hoppers;

a grinding mechanism operatively associated with said controllable dispenser for grinding beans received therefrom and discharging ground coffee;

a control circuit coupled with said controllable dispenser for selectively operating said dispenser to dispense a desired quantity of coffee beans into said grinding mechanism;

selection means coupled with said control circuit for allowing a user to select a desired weight of ground coffee to be produced; and calibration means coupled to said control circuit, said calibration means including user operable controls for entering an actual weight of the ground coffee discharged from said grinding mechanism; a microprocessor for calculating a correction factor corresponding to the entered actual weight, said calibration means entering the actual weight of ground coffee into said microprocessor for use in calculating a correction factor; and storage means for storing a plurality of frequently selected weight settings and for storing a plurality of correction factors corresponding to a plurality of weight settings.

2. A coffee grinding apparatus as recited in claim 1, said user operable controls of said calibration means including a calibration mode activation switch for activating said calibration mode, incrementing and decrementing keys for entering a true weight value into said microprocessor, and display means for displaying the values being entered by said incrementing and decrementing keys.

3. A coffee grinding apparatus as recited in claim 1, said selection means further comprising a brewer interface, said brewer interface coupling a brewing apparatus including said selection means to said grinding apparatus, said brewer interface allowing a user to select a desired weight of ground coffee to be produced by said grinding apparatus at said selection means associated with said brewing apparatus.

4. A calibration circuit for use with a coffee grinding apparatus which measures a quantity of coffee for grinding as a function of time, said coffee grinding apparatus having two storage hoppers, a dispenser associated with each of said hoppers, a grinding mechanism operatively associated with said dispensers, selection means, and a control circuit coupled to said dispenser and said grinding mechanism, said calibration circuit being coupled to said control circuit, said calibration circuit including controls for allowing a user to enter an actual weight of the ground coffee produced by the grinding apparatus, said calibration circuit employing the entered actual weight in calculating a grinding correction factor, and storage means for storing a plurality of frequently selected weight settings and for storing a plurality of correction factors corresponding to a plurality of weight settings.

5. A calibration circuit for use with a coffee grinding apparatus as recited in claim 4, said controls of said calibration circuit including a calibration mode activation switch for activating said calibration mode, incrementing and decrementing keys for entering a true weight value into said control circuit, and display means for displaying the values being entered by said incrementing and decrementing means.

6. A calibration circuit for use with a coffee grinding apparatus as recited in claim 4, said selection means further comprising a brewer interface, said brewer interface coupling a brewing apparatus including said selection means to said grinding apparatus, said brewer interface allowing a user to select a desired weight of ground coffee to be produced by said grinding apparatus at said selection means associated with said brewing apparatus.

7. A coffee grinding apparatus which measures a quantity of coffee for grinding as a function of time, said coffee grinding apparatus comprising:

a control circuit;

means for selecting a desired weight of ground coffee to be produced by said grinding apparatus, said selecting means being coupled with said control circuit;

two storage hoppers;

a time controlled dispenser associated with each of said hoppers, said time controlled dispensers being coupled to said control circuit, each of said dispensers controllably dispensing a selected quantity of whole coffee beans as a function of time as provided by said control circuit;

a grinding mechanism operatively associated with said dispensers for grinding beans dispensed from said dispensers; and calibration means coupled to said control circuit and said dispensers, said calibration means including controls for allowing a user to enter an actual weight of the ground coffee to be produced by the grinding apparatus, said calibration means transferring the actual weight to said control circuit for use in calculating a correction factor and further including storage means for storing a plurality of frequently selected weight settings and for storing a plurality of correction factors corresponding to a plurality of weight settings and a calibration mode activation switch for activating said calibration mode, incrementing and decrementing keys for entering a true weight value into said control circuit.

8. A coffee grinding apparatus as recited in claim 7, said calibration means further including display means for displaying the values being entered by said incrementing and decrementing means.

9. A coffee grinding apparatus as recited in claim 7, said selection means further comprising a brewer interface, said brewer interface being coupled to said control circuit and a beverage brewing apparatus having a batch selector, said brewer interface transmitting a selection signal from said beverage brewing apparatus to said grinding apparatus upon selection of a batch at said beverage brewing apparatus, said selection signal being used by said control circuit to control said grinding mechanism for an associated period of time.

* * * * *